Patented Dec. 29, 1931

1,839,161

UNITED STATES PATENT OFFICE

GEORGE M. NORMAN, OF WILMINGTON, DELAWARE, ASSIGNOR TO HERCULES POWDER COMPANY, OF WILMINGTON, DELAWARE, A CORPORATION OF DELAWARE

METHOD OF PRODUCING GLYCOL ESTERS OF ABIETIC ACID

No Drawing. Application filed August 10, 1927. Serial No. 212,147.

My invention relates to the production of glycol esters of abietic acid and it is the object of my invention to provide a method for the production of glycol esters of abietic acid. In accordance with the method embodying my invention, I effect the heating of a rosin, for example, wood rosin, or gum rosin, such as is obtained from pine wood, a fossil resin, or other resin acid, as primaric acid, with a glycol. I may use a catalyst in order to facilitate the reaction between the glycol and the rosin and upon completion of the reaction excess glycol and any low end of rosin which may be present are desirably distilled off, preferably under reduced pressure.

The glycol esters of abietic acid may not be distilled readily; therefore it is desirable in carrying out the method embodying my invention to use a light colored rosin, as a high grade of gum rosin, or a wood rosin which has been purified, as for example, by distillation. In carrying out the method embodying my invention the glycol used may be, for example, ethylene glycol, propylene glycol, or other higher aliphatic glycols; and as a catalyst there may be used, for example, zinc dust, boric acid, or an operative equivalent thereof.

As an example of the carrying out of the method embodying my invention, 300 parts of purified wood rosin, for example, having an acid number 162, a melting point of 78° C. and grading H in color are heated with 35 parts of ethylene glycol and 5 parts of zinc dust. The heating should be at about 195° C. continued for about 12 hours with or without agitation. After heating for about 12 hours at about 195° C. the temperature should be raised to about 300° C. and the pressure lowered to about one-half inch of mercury in order to distill off excess glycol and any low end of rosin which may be present. After distillation off of excess glycol and any rosin there will remain as residue about 270 parts of ester, having an acid number of 25, a melting point of 76° C. and grading F in color. The above example may be modified by the use of one part of zinc dust and heating for about 16 hours with the production of an ester having an acid number 16.

As a further example, 300 parts of purified wood rosin, 35 parts of ethylene glycol and 5 parts of boric acid may be heated at about 195° C. for about 16 hours, with subsequent distillation off of excess glycol and rosin at about 300° C. under a pressure of about one-half inch of mercury. There will be produced about 290 parts of glycol ester, having an acid number 8 and a melting point of 64° C.

The reaction produced by heating the rosin and ethylene glycol may be expressed by the following equation:

$$C_2H_4(OH)_2 + 2C_{19}H_{29}COOH = C_2H_4(OCOC_{19}H_{29})_2 + 2H_2O$$

The propylene glycol ester and higher aliphatic glycol esters may be prepared in a similar manner. The trimethylene glycol ester may be made by heating 100 g. of grade H rosin, 22 g. of trimethylene glycol and 0.6 g. zinc dust to about 200° C. for 15 hours. The temperature is then raised to around 300° C. and the low end of rosin and excess trimethylene glycol removed by distilling under reduced pressure. About 78 g. of the trimethylene glycol ester of abietic acid, having an A. N. of 19, is recovered as residue.

It will be understood that the use of a catalyst is not essential, but as indicated facilitates the reaction and shortens the time required for esterification. Further, it will be understood that the reaction may be accelerated by increase in heating temperature, but it will be appreciated that, for example, when ethylene glycol having a boiling point of 197° C. is used, if the heating temperature is much above about 195° C. an increase in pressure over atmospheric will be required.

Having now fully described my invention, what I claim and desire to protect by Letters Patent is:

1. The method of producing glycol esters of abietic acid, which includes heating rosin with an aliphatic glycol in the presence of zinc dust.

2. The method of producing glycol esters of abietic acid, which includes distilling rosin, heating the distilled rosin with an aliphatic glycol and zinc dust at a temperature of about 195° C. to form an ester and distilling off excess glycol at about 300° C. under reduced pressure.

3. The method of producing a glycol ester of abietic acid, which includes heating rosin with ethylene glycol and zinc dust.

4. The method of producing a glycol ester of abietic acid, which includes heating rosin with ethylene glycol and zinc dust and distilling off the excess ethylene glycol under reduced pressure.

5. The method of producing a glycol ester of abietic acid, which includes distilling rosin, heating the distilled rosin with an aliphetic glycol and zinc dust at about 195° C. for about six hours and distilling off the excess glycol and low end of rosin at about 300° C. under a pressure of about one-half inch of mercury.

In testimony of which invention, I have hereunto set my hand at Wilmington, Delaware, on this 2nd day of August, 1927.

GEORGE M. NORMAN.